United States Patent [19]

Zenda

[11] Patent Number: 5,218,274
[45] Date of Patent: Jun. 8, 1993

[54] FLAT PANEL DISPLAY CONTROLLER USING DUAL-PORT MEMORY

[75] Inventor: Hiroki Zenda, Hamura, Japan

[73] Assignee: Kabushiki Kaisha Toshiba, Kawasaki, Japan

[21] Appl. No.: 557,457

[22] Filed: Jul. 25, 1990

[30] Foreign Application Priority Data

Jul. 31, 1989 [JP] Japan .................................. 1-198354

[51] Int. Cl.⁵ .......................... H01J 29/70; H01J 29/72
[52] U.S. Cl. .................................. 315/366; 340/717
[58] Field of Search .................... 315/366; 313/422; 340/717, 716

[56] References Cited

U.S. PATENT DOCUMENTS

| | | | |
|---|---|---|---|
| 3,771,145 | 11/1973 | Wiener | 340/173 R |
| 3,928,845 | 12/1975 | Clark . | |
| 4,121,283 | 10/1978 | Walker . | |
| 4,344,021 | 8/1982 | Johnston | 315/383 |
| 4,399,524 | 8/1983 | Muguruma et al. . | |
| 4,422,163 | 12/1983 | Oldenkamp . | |
| 4,430,649 | 2/1984 | Leininger . | |
| 4,454,593 | 6/1984 | Fleming et al. . | |
| 4,536,856 | 8/1985 | Hiroishi . | |
| 4,566,005 | 1/1986 | Apperley et al. . | |
| 4,574,279 | 3/1986 | Roberts . | |
| 4,611,203 | 9/1986 | Criscimagna et al. . | |
| 4,628,534 | 12/1986 | Marshall . | |
| 4,679,038 | 7/1987 | Bantz et al. . | |
| 4,730,186 | 3/1988 | Koga et al. . | |
| 4,751,502 | 6/1988 | Ishii et al. . | |
| 4,760,387 | 7/1988 | Ishii et al. . | |
| 4,763,279 | 8/1988 | Kellam et al. . | |
| 4,764,975 | 8/1988 | Inoue et al. . | |
| 4,769,852 | 9/1988 | Hashimoto et al. . | |
| 4,847,788 | 7/1989 | Shimada . | |
| 4,855,728 | 8/1989 | Mano et al. | 340/805 |
| 4,926,166 | 5/1990 | Fujisawa et al. | 340/717 |

FOREIGN PATENT DOCUMENTS

| | | |
|---|---|---|
| 0107010A3 | 5/1984 | European Pat. Off. . |
| 8610119.5 | 9/1986 | European Pat. Off. . |
| 87303469.8 | 11/1987 | European Pat. Off. . |
| 0326158A2 | 8/1989 | European Pat. Off. . |
| 3718078A1 | 12/1987 | Fed. Rep. of Germany . |
| 63-013551 | 1/1988 | Japan . |

OTHER PUBLICATIONS

Operation Manual—Egawonder.
Advertisement—Egawonder.
IBM Enhanced Graphics Adapter-IBM Enhanced Graphics—(Aug. 2, 1984).
PEGA 2 User's Guide, 50208, Rev. 4, 1986, Paradise Systems, Inc., pp. 10–16 and 50.

*Primary Examiner*—Theodore M. Blum
*Attorney, Agent, or Firm*—Finnegan, Henderson, Farabow, Garrett & Dunner

[57] ABSTRACT

CRT display data output by a CRT controller is written in a frame memory at display timings of a CRT, and is read out of the frame memory at display timings of a flat panel display. The frame memory is comprised of by a dual-port memory. A flat panel display-controlling circuit writes the display data, output by the CRT controller, in the frame memory through the data write port of the dual-port memory, and reads the display data out of the frame memory through the data read port of the dual-port memory in synchronism with the display timings of the flat panel display. The data writing operation and the data reading operation are performed concurrently.

5 Claims, 3 Drawing Sheets

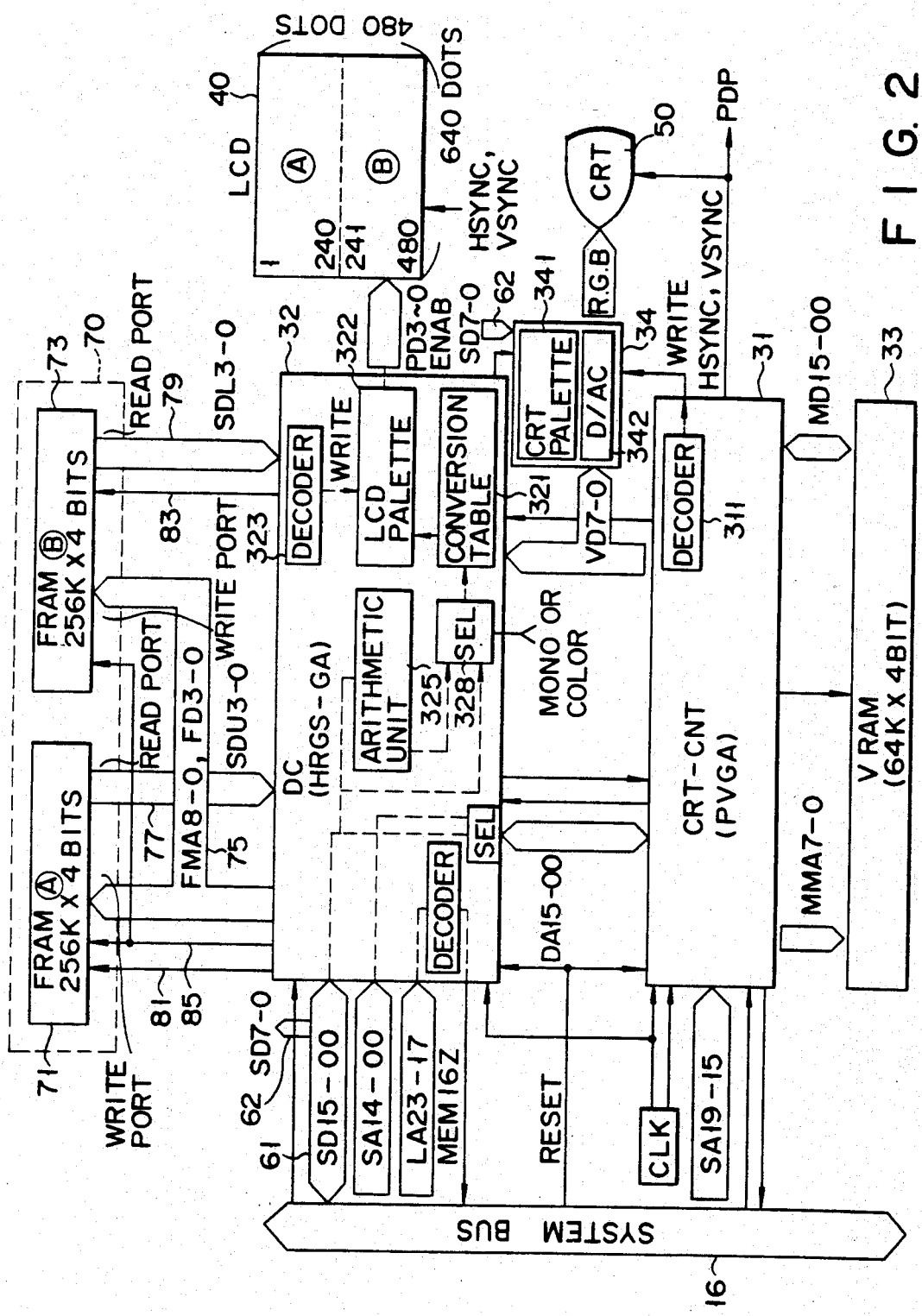
F I G. 2

WRITE
MEMORIES 71, 73

READ
MEMORY 71

READ
MEMORY 73

FLAT PANEL DISPLAY CONTROLLER USING DUAL-PORT MEMORY

BACKGROUND OF THE INVENTION

1. Field of the Invention

The present invention relates to a flat panel display-controlling circuit suitable for use in a personal computer.

2. Description of the Related Art

A lap top type personal computer, wherein a display is integral with the computer's main body, has become prevalent in the field of personal computers. A flat panel type display, such as a plasma display or a liquid crystal display (LCD), is in wide use as a display suitable for the lap top type personal computer. However, many of the application programs used with personal computers are developed on the assumption that they are executed by use of a CRT display. Therefore, the lap top type personal computer whose flat panel type display is integral with the main body has to comprise a display control circuit which enables even an application program originally developed for a CRT display type computer to be executed by a flat panel display type computer as well.

Under these circumstances, it is necessary to design a display control circuit such that it can control the flat panel display by use of a CRT display controller, or such that the same data can be simultaneously shown on both the CRT display and the flat panel display. To satisfy this necessity, the display control circuit incorporates a special type of memory (which is generally referred to as a "frame memory") for storing the data to be shown on the display screen. It is also necessary to provide a circuit which enables screen data to be temporarily stored in the frame memory and to be output to the flat panel display at the necessary timings, by use of the display controller which controls the read/write operation performed with respect to the frame memory. The frame memory has to be provided with two ports, one for the writing of data performed to store display data, and the other for the displaying of data. Therefore, in the case where an ordinary one-port dynamic random access memory (DRAM) is employed, it is necessary to control the two ports of the frame memory in a time-divisional manner.

The accessing speed (namely, the speed at which data is read or written) is determined due to characteristics of the DRAM and a static random access memory (SRAM) to be used. In the case where data is shown on a monochromatic flat panel display (e.g., an LCD), single-gradation display data has to be read at a speed of about 40 ns/dot. The screen of the LCD is divided into upper and lower screen portions, and the data display operation for the upper screen portion has to be performed simultaneously with the data display operation for the lower screen portion. In practice, therefore, the reading speed should be about 20 ns/dot, which is one half of the reading speed noted above. Where a DRAM providing an ordinary accessing speed is employed (cycle time: 160 ns), data of 8 dots (=160 ns/20 ns) can be read. Where data having sixteen gradations is displayed, it is expressed in 4 bits, so that data of 32 bits (8 dots×4) has to be read at one time. Accordingly, it is necessary to employ four SRAMs of 8-bit width, and eight DRAMs of 4-bit width. In order to display, on the flat panel display, 16-gradation (4-bit) data with a resolution of 640×480 dots, it is necessary to employ a memory whose capacity is 1.2 Mbits (640×480×4). Even if four SRAMs (the memory capacity of each of which is 256 Kbits [=32 K×8 bits]) are employed, the total memory capacity is no more than 1 Mbit (32 K×8 bits×4). It should be noted that a 512-Kbit memory is not commercially available, and the commercially-available memory having a larger memory capacity than 256 Kbits is a 1-Mbit memory. Therefore, there is no other way but to use eight SRAMs. (The use of four 1 M SRAMs is not realistic from the view point of cost.) In conclusion, eight memory elements (32 K×8 bits, or 64 K×4 bits) are required to obtain one frame memory.

As mentioned above, a display device comprising a flat panel display has to employ a frame memory exclusively used for showing data on the flat panel display. In addition, the display device has to employ a so-called VRAM (video RAM), to store display data. Due to the need to employ these two types of memories, the display circuit requires a wide installation area on a printed circuit board, resulting in a complex hardware construction.

SUMMARY OF THE INVENTION

Accordingly, an object of the present invention is to provide a flat panel display-controlling circuit which employs a dual-port DRAM including a data-writing port and a data-reading port, and which is capable of controlling the display of data with a compact-in-size, low-in-price structure.

To achieve this object, the present invention provides a flat panel display control apparatus for displaying data on a flat panel display unit and a cathode ray tube (CRT) display unit, which comprises: video random access memory (RAM) means for storing display data to be shown on the flat panel display and the CRT display unit; cathode ray tube (CRT) display controller means for reading the display data out of the video RAM means at predetermined CRT display timings; frame memory means, including a dual-port memory, for storing display data to be displayed on the flat panel display unit; and flat panel display-controlling means for display-controlling the flat panel display unit, reading the display data from the video RAM means by the CRT display controller means, writing the display data in the frame memory means in synchronism with the CRT display timings, and for reading the display data stored in the frame memory means at predetermined flat panel display timings to perform display control of the flat panel display unit.

In the present invention, the frame buffer is constituted by a dual-port memory. Therefore, it is not necessary to perform time-division control, as in the prior art, nor is it necessary to widen the data bus. Since the number of frame memories needed can be reduced, the display circuit does not require a wide installation area on a printed circuit board. For example, the frame memory needed to display 16-gradation data with a resolution of 640×480 dots can be comprised by two dual-port memories of 256 K×4 bits (=1 Mbits). In the present invention, moreover, the frame memory and the LCD display-controlling circuit for controlling the frame memory are formed in the same gate array. As a result, a 16-gradation LCD display circuit can be used for the LCD. Since the number of memory elements required for the frame memory can be reduced from 8 to 2 the LCD display circuit can be compact in size.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a detailed block circuit diagram showing a detailed circuit arrangement used in the embodiment shown in FIG. 1.

DETAILED DESCRIPTION OF THE PREFERRED EMBODIMENTS

Figure 1:
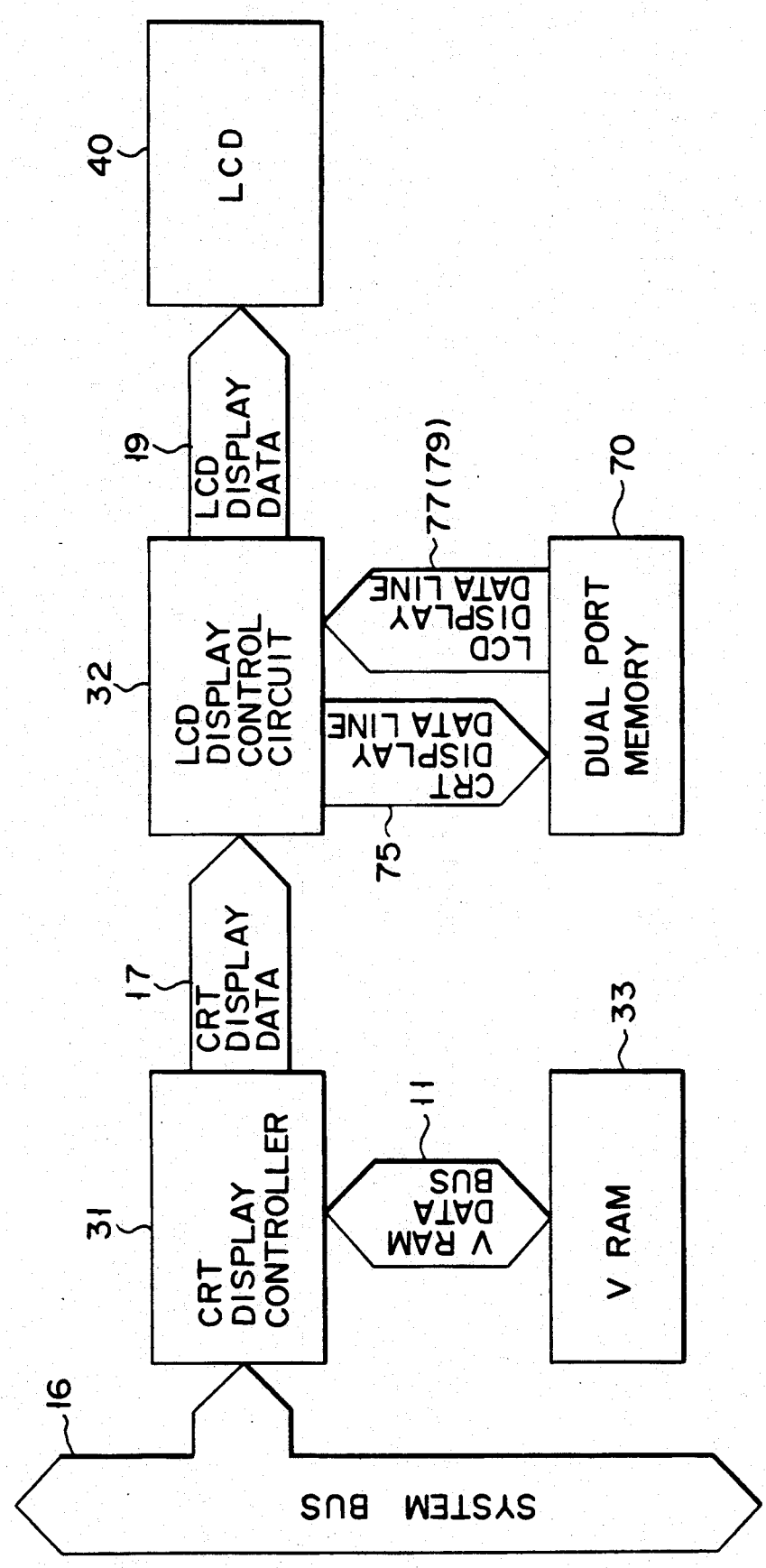
FIG. 1 is a block circuit diagram showing one embodiment of the present invention.

FIG. 1 is a block circuit diagram showing one embodiment of the present invention. Referring to FIG. 1, a CRT display controller 31 reads display data out of a video RAM (VRAM) 33 at predetermined display timings. The VRAM 33 stores display data supplied from a CPU (not shown) and is accessed by the CRT display controller 31 through a V-RAM data bus 11. An LCD display control circuit 32 temporarily stores, in a frame memory (dual-port memory 70), CRT display data output from the CRT display controller 31 to the VRAM 33, reads the CRT display data at the LCD display timings, and displays the readout data on an LCD 40. The dual-port memory 70 stores screen data and is controlled by the LCD display control circuit 32. The dual-port memory 70 has two ports, one used for writing the display data and the other used for reading the display data. Data to be displayed is written in the dual-port memory 70 at CRT display timings under the control of the LCD display control circuit 32. The data, thus written, is read out of the dual-port memory 70 at LCD display timings. The LCD 40 outputs or displays the screen information which is read out of the dual-port memory 70 under the control by the LCD display control circuit 32. A system bus 16 is used when the CPU reads or writes data with reference to both the VRAM 33 and the register (which is incorporated in the CRT display controller 31 and stores data regarding the display timing parameters determined in accordance with the display resolution). The VRAM data bus 11 is provided to enable the CPU to access the VRAM 33 and to read data to be displayed. Specifically, the VRAM data bus 11 is used when the CRT display controller 31 reads or writes data with respect to the VRAM 33.

CRT display data 17 is output from the CRT display controller 31 in synchronism with the timing at which data is displayed on a CRT display (not shown). The LCD display control circuit 32 writes display data through dual-port memory write data line 7 in the dual-port memory 70 in synchronism with the time at which data is displayed on the CRT display. Further, the circuit 32 reads display data through dual-port memory read data line 77(79) from the dual-port memory 70 in synchronism with the timing at which data is displayed on the LCD 40. The LCD display control circuit 32 converts the display data stored in the stored in the dual-port memory 70 into 16-gradation data 19, for example, and supplies the 16-gradation data 19 to the LCD 40.

FIG. 2 is a detailed block circuit diagram showing the circuit arrangement of FIG. 1 in more detail.

Referring to FIG. 2, the CRT display controller (CRT-CNT) 31 drives a CRT display unit 50 such that the CRT display unit 50 displays data at high resolution (720 dots). The CRT controller 31 described above may adopt a PVGAI available from Paradise, U.S.A. The CRT-CNT 31 includes a decoder 311. The decoder 34 decodes the port address of a CRT palette 341, and outputs a write signal to the CRT palette 341.

The LCD display control circuit 32 has two functions: namely, a bus interface function of exchanging display control data of various kinds with the CPU through the system bus (CPU bus) 16 and a function of controlling the display operation performed by the LCD 40. The LCD display control circuit 32 is formed by a programmable logic array (PLA) on the same chip as the dual-port memory 70. The LCD display control circuit 32 includes a conversion table 321, on the basis of which 64-gradation data used for the monochromatic CRT display 50 is converted into 16-gradation data used for the LCD 40.

The LCD display control circuit 32 includes an LCD palette 322 for generating gradations with which to display data. It also includes a decoder 323 which has a similar structure to that of the decoder 311 of the CRT-CNT 31. The decoder 323 decodes the port address of the CRT palette 341 and outputs a write signal to the LCD palette 322. In this embodiment, the decoder 323 and the decoder 311 are provided independently of each other. In place of this arrangement, an arrangement employing a single decoder 311 may be employed, if desired. Where this alternative arrangement is employed, an output of the decoder 311 is supplied to both the CRT palette 341 and the LCD palette 322 as a write signal.

The VRAM 33 is a RAM of 64 K×4 bits and stores display data. A CRT display data generation section 34 generates analog display data under the control of the CRT-CNT 31, and incorporates a digital-to-analog converter 342 in addition to the CRT palette 341 mentioned above. The data bus denoted by reference numeral 61 is a 16-bit data bus (SD15-0) through which data of various kinds, such as palette data for rewriting, is transferred between the system bus 16 and the LCD display control circuit 32. The data bus denoted by reference numeral 62 is a data bus (SD7-0) through which the palette data to be written is supplied from the CRT display data generation section 34 to the CRT palette 341.

The frame memory 70 is made up of a first dual-port memory 71 storing display data corresponding to LCD upper screen A and a second dual-port memory 73 storing display data corresponding to LCD lower screen B, each being 256 K×4 bits. A frame memory address FMA8-0 is supplied to the first and second dual-port memories 71 and 73 through an address/data bus 75. Frame write data is also supplied to the first and second dual-port memories 71 and 73 through the same address/data bus 75. The serial data SDU3-0 for the upper screen portion is supplied from the first dual-port memory 71 to the LCD display control circuit 32 through a data bus 77, while serial data SDLO-3 for the lower screen portion is supplied from the second dual-port memory 73 to the LCD display control circuit 32 through a data bus 79. The LCD display control circuit 32 supplies a write enable signal for the upper screen portion to the first dual-port memory 71 through a line 81, and supplies a write enable signal for the lower screen portion to the second dual-port memory 73 through a line 83. Further, the LCD display control circuit 32 supplies a frame memory RAS signal, a frame memory CAS signal, a serial clock, and a data transfer-/output enable signal to the first and second dual-port memories 71 and 73 through a line 85. Note that the LCD upper screen A means LCD column addresses 1 through 240 and the LCD lower screen B means LCD column addresses 241 through 480.

In the circuit arrangement shown in FIG. 2, the same address is supplied to both the first and second dual-port memories 71 and 73. Therefore, it may happen that write access will contend with read access in the first and second dual-port memories 71 and 73. In order to avoid such contention, each of the first and second dual-port memories 71 and 73 is provided with a counter (not shown). This counter automatically increments to generate the respective read addresses of the respective dual port memories 71 and 73.

Note that the lap-top type personal computer is equipped with the LCD (or PDP) 40 as a standard unit and the CRT monitor 50 is externally connected as an optional unit.

The operation of the embodiment mentioned above will now be described, with reference to FIGS. 1 through 3C.

First of all, the CPU writes display timing data in the register incorporated in the CRT-CNT 31, and writes display data in the VRAM 33. In accordance with the display timing, the CRT-CNT 31 reads the display data out of the VRAM 33 and outputs CRT display data 17. The operation performed up to this point is similar to that performed by an ordinary CRT controller. The CRT display data 17 may be displayed on the CRT 50 as it is. The values written in the CRT-CNT 31 are for the CRT, so that a basic input and output system (BIOS) and application programs adapted for a CRT can be used as they are on the basis of the values written in the CRT-CNT 31. The LCD display control circuit 32 then writes the CRT display data in the dual-port memory 70, using the same timing at which it received the CRT display data.

In order to allow data to be displayed with 640 dot×480 dots×16 gradations, the dual-port memory 70 is made up of memories 71 and 73 each of which is 256 K×4 bits. An address of each memory designates the location of one pixel on the display screen. One dual-port memory 71 is used for storing the data related to the LCD upper screen A, and one dual-port memory 73 is used for storing the data related to the LCD lower screen B. Thus, two dual-port memories 71 and 73 are used for the entire screen of the LCD. Four-bit data (=16-gradation data) can be stored at each location of the respective memories 71 and 73. Since the display timing of the CRT monitor 50 is 40 ns per pixel, eight pixels are processed as one block. In other words, data is written every eight pixels, so as to meet the cycle time (normally, 160 ns) of the write port of the dual-port memory 70. In this case, the cycle time of the data write is 320 ns (=40ns×8). More specifically, the pixel data regarding the entire screen is written by use of eight frames, such that the 1st, 8th and 16th pixels are written in the first frame, the 2nd, 9th and 17th pixels are written in the second frame, the 3rd, 10th and 18th pixels are written in the third frame, and so on.

Figure 3A:
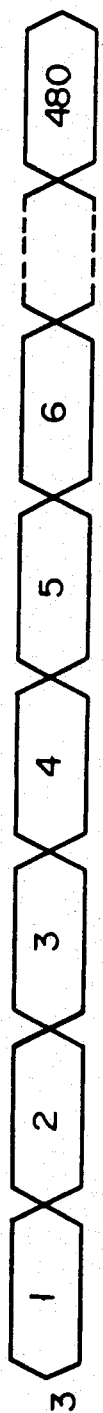
FIGS. 3A through 3C are flowcharts illustrating timings at which display data is written or read with respect to a frame memory, FIG. 3A being a flowchart of data-write timings, and FIGS. 3B and 3C being flowcharts of data-read timings.
Figure 3B:
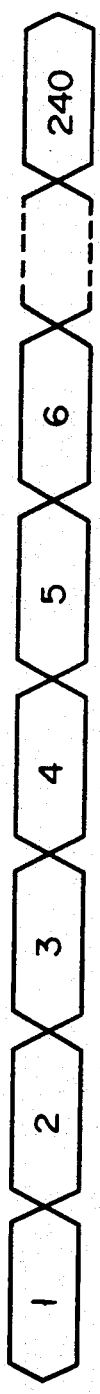
Figure 3C:

FIG. 3A illustrates timings at which the CRT display data 17 is written. The CRT display data 17 is constantly transmitted at the display timings of the CRT, so that the screen image of the LCD is not adversely affected as a result of the transfer of one-screen data in eight frames. In other words, the LCD display control circuit 32 constantly reads the display data through the reading ports of the dual-port memories 71 and 73, i.e., without reference to the writing of the display data. Thus, the display screen is in no way adversely affected by the timings at which the display data is written. Simultaneous with the writing operation, the LCD display control circuit 32 reads screen data out of the dual-port memory 70 in accordance with the display timings of the LCD. As is shown in FIGS. 3B and 3C, this reading operation is performed such that the reading of data from the dual-port memory 71 (which stores data on the upper screen portion) and the reading of data from the dual-port memory 73 (which stores data on the lower screen portion) are executed concurrently. Pixel data is serially read through the serial-read port of the dual-port memory 70. Since the serial-read cycle of this serial-read port is about 40 ns, this read cycle does not produce any problem with reference to the read cycle (20 ns) determined for the data display on the LCD 40. Upon receipt of the dual-port memory read data 15, the LCD display control circuit 32 outputs the LCD display data 19 to the LCD 40. In the case of 16-gradation display, the data is comprised of 4 bits (PD3-0), so that the data obtained by combining the upper-screen data and the lower-screen data is comprised of 8 bits. Upon reception of this LCD display data 19, the LCD 40 displays it with 16 gradations.

When describing the foregoing embodiment, reference was made to the case where the flat panel display is an LCD. Needless to say, the present invention is not limited to this and it is applicable to any type of flat panel display.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A flat panel display control apparatus for displaying data on a flat panel display unit and a cathode ray tube (CRT) display unit, comprising:
    video random access memory (RAM) means for storing display data to be displayed on the flat panel display unit and the CRT display unit;
    cathode ray tube (CRT) display controller means for reading the display data out of the video RAM means at predetermined CRT display timings;
    frame memory means, including dual-port memory means, for storing display data to be displayed on the flat panel display unit; and flat panel display-controlling means for display-controlling the flat panel display unit, by reading the display data from the video RAM means by the CRT display controller means, by writing the display data into the frame memory means in accordance with timing signals required for display-controlling the CRT display unit, and by reading the display data stored in the frame memory means in accordance with timing signals required for display controlling the flat panel display unit to perform display control of the flat panel display unit.

2. A display controller according to claim 1, wherein a first port of the dual-port memory means serves as a data write port and a second port of the dual-port memory means serves as a data read port, and the flat panel display-controlling means writes the display data in the data write port in accordance with the CRT timing signals and reads the display data out of the data read port in accordance with the flat panel display timing signals.

3. A display controller according to claim 2, wherein said flat panel display-controlling means performs, in parallel, the writing of the display data in the data write port and the reading of the display data out of the data read port.

4. A display controller according to claim 1, wherein said flat panel display unit is a liquid crystal display unit.

5. A display controller according to claim 1, wherein said flat panel display unit is a plasma display unit.

* * * * *

UNITED STATES PATENT AND TRADEMARK OFFICE
CERTIFICATE OF CORRECTION

PATENT NO. : 5,218,274
DATED : June 08, 1993
INVENTOR(S) : Hiroki Zenda

It is certified that error appears in the above-indentified patent and that said Letters Patent is hereby corrected as shown below:

Abstract, Title Page, line 4, delete "by".

Claim 1, column 7, line 9, after "display" insert "-".

Signed and Sealed this

Tenth Day of May, 1994

Attest:

BRUCE LEHMAN

Attesting Officer

Commissioner of Patents and Trademarks